(12) United States Patent
Reinosa

(10) Patent No.: US 9,932,868 B2
(45) Date of Patent: Apr. 3, 2018

(54) APPARATUS FOR PROVIDING FINE FILTRATION TO HYDRAULIC SYSTEMS AND INTERNAL COMBUSTION ENGINES

(71) Applicant: Adan Reinosa, Montebello, CA (US)

(72) Inventor: Adan Reinosa, Montebello, CA (US)

(*) Notice: Subject to any disclaimer, the term of this patent is extended or adjusted under 35 U.S.C. 154(b) by 0 days.

(21) Appl. No.: 14/756,770

(22) Filed: Oct. 10, 2015

(65) Prior Publication Data
US 2017/0101910 A1  Apr. 13, 2017

(51) Int. Cl.
| | |
|---|---|
| F01M 11/03 | (2006.01) |
| B01D 35/153 | (2006.01) |
| F01M 1/10 | (2006.01) |
| F02M 37/14 | (2006.01) |
| F02M 37/22 | (2006.01) |

(52) U.S. Cl.
CPC ........ F01M 11/03 (2013.01); B01D 35/153 (2013.01); F01M 1/10 (2013.01); F01M 2001/1007 (2013.01); F01M 2001/1071 (2013.01); F02M 37/14 (2013.01); F02M 37/22 (2013.01)

(58) Field of Classification Search
CPC ......... F02M 37/14; F02M 37/22; F01M 1/10; F01M 11/03; F01M 2001/1007; F01M 2001/1085; B01D 35/153
See application file for complete search history.

(56) References Cited

U.S. PATENT DOCUMENTS

| | | | | |
|---|---|---|---|---|
| 2,680,520 A | * | 6/1954 | Beardsley | B01D 29/54 210/239 |
| 2,843,268 A | * | 7/1958 | Kennedy | B01D 29/21 210/130 |

(Continued)

*Primary Examiner* — Terry K Cecil

(57) ABSTRACT

The present invention teaches a method and apparatus to quickly and inexpensively implement advanced, bypass grade, fine, or additional filtration to engines and hydraulic systems using any filter media through a single conduit means. The present invention has the ability to make quick hydraulic connection to the engine or hydraulic system, where oil is super cleaned, without major modifications as is the paradigm by traditional bypass filtration systems and without removing any lubricant from the engine or system that the present invention is connected to, as is the paradigm of traditional bypass filtering systems. When connected to the normally provided stud for the spin-on oil filter in an engine or hydraulic system, the net effect of interest to the present invention is that by simply placing the adapter at the point of connection of the spin-on oil filter, many of the necessary plumbing associated with the traditional bypass filter installation is obviated, as is the energy and labor intensive process of seeking for a pressure point and a return of the oil. For canister type filters in engine or other applications, a single access point to the lubrication system is all that is needed. The present invention relies on the variable pressure of the working fluid, be it engine oil or hydraulic fluid, to route through a single bidirectional conduit means first to route to the high efficiency filter an amount of dirty oil and then to return same amount minus the inside volume of the single conduit an amount of super filtered oil from a combination of an accumulator, a high efficiency filter media and strategically located check valves to control such bidirectional flows through the single connection conduit.

4 Claims, 2 Drawing Sheets

(56) References Cited

U.S. PATENT DOCUMENTS

| | | | | |
|---|---|---|---|---|
| 2,929,605 A * | 3/1960 | Wolfe | ............... | F16K 31/122 251/31 |
| 2,966,296 A * | 12/1960 | Morley | ............... | F01D 3/00 415/105 |
| 2,995,253 A * | 8/1961 | Belgarde | ............... | B01D 27/08 210/130 |
| 3,389,801 A * | 6/1968 | Sieger | ............... | F02M 37/14 137/565.3 |
| 4,036,755 A * | 7/1977 | Dahm | ............... | B01D 27/08 210/167.04 |
| 4,452,695 A * | 6/1984 | Schmidt | ............... | B01D 27/08 123/196 A |
| 4,642,184 A * | 2/1987 | Liepse | ............... | A47J 43/284 210/240 |
| 5,178,753 A * | 1/1993 | Trabold | ............... | B01D 29/072 210/130 |
| 5,556,543 A * | 9/1996 | Trabold | ............... | B01D 29/072 210/435 |
| 5,695,637 A * | 12/1997 | Jiang | ............... | B01D 27/06 210/316 |
| 5,843,284 A * | 12/1998 | Waters | ............... | B01D 27/02 196/115 |
| 5,868,931 A * | 2/1999 | Janik | ............... | B01D 35/26 210/117 |
| 6,605,215 B2 * | 8/2003 | Assion | ............... | B01D 27/144 210/117 |
| 6,666,968 B2 * | 12/2003 | Smith | ............... | B01D 29/15 210/254 |
| 6,951,606 B2 * | 10/2005 | Cousineau | ............... | B01D 29/096 123/196 A |
| 7,048,848 B2 * | 5/2006 | Assion | ............... | B01D 27/144 210/117 |
| 7,090,773 B2 * | 8/2006 | Meddock | ............... | B01D 27/148 210/342 |
| 8,123,942 B2 * | 2/2012 | Assion | ............... | B01D 27/06 210/315 |
| 8,241,494 B2 * | 8/2012 | Assion | ............... | B01D 27/06 210/132 |
| 8,409,435 B2 * | 4/2013 | Geiger | ............... | B01D 1/0017 210/149 |
| 8,623,218 B2 * | 1/2014 | Geiger | ............... | B01D 1/0017 123/196 A |
| 8,623,219 B2 * | 1/2014 | Geiger | ............... | B01D 1/0082 123/196 A |

* cited by examiner

APPARATUS FOR PROVIDING FINE FILTRATION TO HYDRAULIC SYSTEMS AND INTERNAL COMBUSTION ENGINES

BACKGROUND OF THE INVENTION

The present invention relates to a new and quick method and apparatus to achieve bypass grade filtration in engines and any hydraulic equipment using or not a spin-on oil filter, a replaceable element inside a canister or canister type filter, or any other filter media where installation time is dramatically reduced and simplified, with no modifications, fewer parts, and lower weight.

DESCRIPTION OF PRIOR ART

Background

Bypass filtration is a well known field and many devices have been proposed to achieve fine oil filtration. Engines, and hydraulic systems in industrial processes and other applications, require for their proper performance and longevity a degree of oil or hydraulic filtration that is a compromise between the size of the particles to be captured by the normally provided filter element, be it canister type, spin-on or other media arrangement, and the required flow of the fluid for the proper performance and longevity of the machine or system being protected. In automobiles, there is regularly only a motor oil filter described as a full flow filter. The full flow filter must flow an adequate oil volume and therefore the size of the particles that it traps cannot be too small or the risk of starvation of lubricant to the engine is a possibility, with catastrophic consequences to the engine. Therefore, most full flow filters, be it canister type or spin-on filters, trap particles in the order of 25 to 40 microns in cross section and above in an efficient manner. However, studies have pointed out that particles in the range of 2 to 25 microns are the most harmful to the engine due to the thickness of the lubricating film between rotating partners in an engine. A similar case can be made in other systems such as hydraulic systems in industrial processes and other fluids such as Diesel or gasoline filters.

It is now apparent that in order to stop the mechanical degradation of an engine, the particles that the full flow filter does not trap must be removed by other means since in the presence of the full flow filter these particles move around the lubrication or hydraulic system unfettered and behave like liquid sandpaper with respect to rotating or sliding partners in an engine or hydraulic or fuel system. In addition to the mechanical degradation caused by these particles, some particles are actually damaging to the lubricant in question degrading the additive package that renders lubricants ineffective in protecting the engine and its components. These additives get depleted because contaminant particles react chemically if they are left in suspension and dispersant additives are taxed by their presence, and these result in increased viscosity of the oil where parasitic pumping energy and rotational energy losses are increased accordingly in an engine. Yet another mode of degradation is the reaction of these particles that create acids and deplete the additives degrading what is widely regarded as an indication of the health of the oil, the Total Base Number, or TBN, which is a measure of how well the oil would protect the engine against the presence of acids in the oil. These acids eventually damage parts by pitting the working surfaces, among other damages. In a hydraulic system, the removal of finer particles is a benefit of finer filtration to prevent equipment degradation.

For example, the advent and increasing popularity of Diesel makes this type of filtration much more attractive since Diesel pollution controls relies on a process known as Exhaust Gas Recirculation, or EGR, in order to control the amounts of tailpipe emissions. This process, although effective for the control of pollution, taxes the oil by loading it with soot particles that find their way to the lubricating oil by means of blowby around piston rings of an engine, increasing oil viscosity and accordingly, parasitic energy losses. It is clear that the current filtration left alone to the functions and capabilities of the full flow filter leaves much to be desired and that an additional filtration device is needed in order to protect the machinery and systems that are being lubricated. A way to protect against this shortcoming is by the use of bypass filtration.

Bypass filtration is a proven and effective technology where a portion of total flow is diverted from the full flow filter and passed through a filter that has a higher filtering capability and then returning it to the engine usually to the crankcase or oil filler cap in a vehicle. These systems are popular in big rigs, or class 8 vehicles, in spite of being costly, difficult to install and maintain. However, the payback of such systems is assured considering the investment and the benefits returned due to their high mileage accrued during operation, which can be in the order of 100,000 miles in a year and even more in some cases. Passenger vehicles are not widely equipped or optioned with these systems because of their cost, complex installation and maintenance. However, the benefits of Advanced Filtration, researched by the US Department of Energy through the Argonne Laboratory, SAE and others, yield an impressive array of benefits, among them: oil life extended up to 10 times, oil filter full flow extended from 3 to 5 times, emissions reduced by up to 15% due to reduced friction and parasitic energy losses, and fuel efficiency increases in the order of 3 to 5% are cited. In addition to the benefits described above some other important benefits are less engine component wear with lower overhaul costs, a better performing engine over its operating life, vehicles with better resale value, and when adopted in great scale it would benefit our country's position with respect to foreign oil dependency. In spite of all the benefits, the complexity of installation and its cost are the main reasons why this current technology is not widely implemented in vehicles used by the general public and government fleets until the advent of the present invention where the cost of manufacture and installation has now been dramatically reduced.

The current methodology of connecting a bypass system is first connecting it to the oil pressure supply in an engine, usually found through a "tee" connection at the oil pressure sending unit. In some cases, this process requires a great expense since the oil pressure sending unit is usually buried right beneath the intake manifold in most modern engines, and even in older engines it is in a most remote location, making searching for the "tee" and plumbing of the system a costly and labor intensive proposition. In addition to that, the return of the purified oil, once the pressure side has been secured, must be done through modifications either to the sump plug at the bottom of the engine, which complicates future oil changes, or return the oil through the oil filling cap, again requiring modification and possible release of contaminants to the environment through shoddy installation.

The present invention solves all problems mentioned above through an apparatus where installation needs minimum modifications to connect the apparatus. As can be appreciated, there is a significant body of prior art in this field that has been built over many years to achieve bypass filtration to engines and systems, representative of this prior art are the following U.S. patents: U.S. Pat. No. 4,452,695, to Schmidt for a full-flow and bypass filter conversion system for internal combustion engines; U.S. Pat. No. 7,090,773, to Meddock and Swanson for a Coaxial full-flow and bypass oil filter; U.S. Pat. No. 6,951,606, to Cousineau and Allen for an Auxiliary filtration system. More illustrative examples for combining full flow and high density filtering have been integrated in one single unit, such as shown in Dahm, et al., U.S. Pat. No. 4,036,755. However, such a filtering system is not made in such a manner that is easily connected to the standard engine filtering system. Also, the high density portion of the filtering would only operate for a much shorter period of time before it would become clogged and the entire flow would then flow through the full-flow portion. Upon clogging of the full-flow portion, the by-pass valve would open and the oil would receive essentially no filtering. The same basic comments are true concerning Belgarde, et al., U.S. Pat. No. 2,995,253. Likewise, Beardsley, U.S. Pat. No. 2,680,520 shows a full-flow and part-flow filter combination. It has the same inherent problems as the previously described full-flow and part-flow filters. These problems may be exhibited by a recently developed combination full flow and a bypass grade Teflon sintered disc, with a rather small loading area for the bypass section, generously estimated to be limited to a cross section of the filter, such as U.S. Pat. No. 6,605,215, to Assion for a Hybrid spin-on oil filter, and U.S. Pat. Nos. 7,048,848, 8,123,942, and 8,241,494 to Assion for, again, a Hybrid spin-on oil filter and similar configurations. These four patents describe a laudable and ingenious interpretation of an old idea whose execution fails to recognize the increased loading of contaminants and the small loading and service capacity of such, while still not fully addressing the environmental impact inherent in spin-on oil filters related to their illegal dumping and disposal. Yet other examples such as Kennedy, U.S. Pat. No. 2,843,268 is simply another variation of the combination full-flow, part-flow filter that also has the problems of life cycle and the pressure drop that can be utilized in the filtering system itself. Belgarde, U.S. Pat. No. 2,929,605, is simply another modification of the combined full-flow and part-flow oil filter. Allen, U.S. Pat. No. 2,966,296 again shows a combined full-flow and by-pass filter with strainer mounted in one single contiguous housing with only one by-pass valve. Further, U.S. Pat. Nos. 8,623,218, 8,623,219, and 8,409,435 to Kenneth L. Geiger, teaches a complicated apparatus and systems that achieve at great complexity and cost an incremental benefit to the simple present invention.

In U.S. Pat. No. 5,178,753 Trabold describes an oil filter for internal combustion engines that is used in a secondary oil circuit in addition to a conventional oil filter. The oil filter includes a filter housing in which a filter element consists of a roll of absorbent paper that is wound about a rod. The oil filter is configured as a set of elements that comprises body sections and caps, and a rod with the rolled filter element. The volume of the oil filter can be matched to a particular application by connecting a plurality of body sections with an appropriate number of rods.

In U.S. Pat. No. 5,556,543 Trabold describes an oil filter for internal combustion engines. The oil filter includes a filter housing and a filter packing made of a porous deformable material, e.g., a roll of absorbent paper. To prevent the filter packing from being deformed and thereby preventing a smooth flow through the filter packing, stabilizing elements, e.g., stabilizing bars, are provided for fixing the form and position of the filter packing within the filter housing.

Other examples can be found in U.S. Pat. No. 6,666,968, to Smith et al. for a Fluid filtration apparatus; U.S. Pat. No. 5,843,284, to Waters et al. for Two-stage oil bypass filter device, and U.S. Pat. No. 5,695,637, to Jiang et al. for a Combination full flow and bypass filter with venturi nozzle.

A long-felt and unfulfilled need exists to provide an oil filter assembly for an internal combustion engine and hydraulic systems that provides bypass grade fine filtration capable of entrapping and, thus, removing smaller particles from the oil than the conventional oil or hydraulic filter.

SUMMARY OF THE INVENTION

The present invention seeks and provides complementary bypass grade filtration to engines or hydraulic equipment in a novel fashion by taking advantage of commonalities and well known structures such as those found in spin-on full flow oil filters and canisters. The typical bypass grade installation, as illustrated by prior art, is on the one hand a very intensive process both for material and labor. There is still the need to install the system at a point of high oil pressure from the system to be protected. However, the place where this pressure point is obtained is usually buried among other components, such as getting it from the oil pressure sending unit, where a point of connection can be made but at the high expense of labor and time, which translates to cost. In addition, once the pressure side is located and installed, a return to the oil has to be provided. This oil return is either to the bottom of the oil sump, requiring again material, labor and modifications, or return the oil to other location such as the oil filler cap, again requiring modifications to the system. Yet, on the other hand, an alternate solution proposes the replacement of the spin-on oil filter with a combination of full flow and bypass grade filter elements in combination, having the compromise of small loading areas and consequent short service interval.

The present invention therefore enjoys advantages over previous art: quick installation, inexpensive to manufacture and maintain, simple connection, large filtering loading area for a long service interval, small size, multifunctional, proven technology, no need to divert or sidestream oil from the engine as traditional bypass systems require, and more.

The present invention requires only a single hydraulic connection to access a hydraulic point in the engine lubrication system or hydraulic system. For example, in spin-on oil filter equipped engines or hydraulic systems the apparatus of the present invention can use an adapter that is sandwiched between the spin-on oil filter and the engine block to access the lubrication system. It uses a modified nipple adapter to install the adapter. The nipple has the ability to affix the adapter to the engine while providing an attachment means to the normally equipped spin-on oil filter. In canister equipped engines, the apparatus of the present invention can be connected by simply drilling a single hydraulic access point directly to the canister cap or any other hydraulic point connected to the engine lubrication system.

When connected to the normally provided stud for the spin-on oil filter in an engine, the net effect of interest to the present invention is that by simply placing the adapter at the point of connection of the spin-on oil filter, or accessing the lubrication system through the single point drilled at the cap of the canister type many of the necessary plumbing associated with the traditional bypass filter installation is obviated, as is the energy and labor intensive process of seeking for a pressure point and an oil return path back to the engine.

By accessing the lubrication system of the engine or the hydraulic system, the apparatus now can follow the variable pressure of the system as it operates and thus through a set of check valves, an accumulator, a high efficiency filtering media, and the single point of connection it can intake fluid to the accumulator during high pressure operating conditions but not before passing it through the high efficiency media, after said high pressure condition the system returns to a lower pressure operating conditions whereby the accumulator now exhausts the cleaned fluid to the engine or hydraulic system. By taking advantage of the ebb and flow of the pressure during operation, the apparatus of the present invention becomes an analogous "breathing system" controlled by the check valves intaking dirty oil or hydraulic fluid and returning analytically clean oil or fluid as the system cycles from high to low and back to high operating pressure conditions. The high efficiency filter or any common bypass grade filter, necessitating high pressure differential to exert flow across, can be used for this invention. The high efficiency filter enjoys low pressure drop across it media element due to its construction and it is therefore more energy efficient than the traditional counterpart. In either case, the rating of said high efficiency filter is desire to be down to below one micron in cross-sectional area, as is the case for the traditional bypass media as well. As it can be appreciated, the apparatus can then work with any bypass grade media type.

Also, by observing that the working oil will flow across the element, a temperature gauge can be placed in the circuit, or at the bypass grade filter element, where it can serve as an analog signal to the health and loading condition of the bypass filter element. Given those reasons above, the present invention is more resourceful, functional, and its strategy of connection leads it to be more readily accepted by the buying public, saving time, labor, the environment, and our domestic natural resources, where doing more with less is the new paradigm.

It is clear to the inventor that this simple device may be of wide acceptance by the public due to its benefits and its low cost, size, a single moving part, manufacturing simplicity and installation and therefore its widespread acceptance would have a positive impact in reducing the consumption of natural resources, increased fuel savings, less consumption of filters, lower emissions, and it is expected that the system will translate into green house gasses reductions, for which the value and trade credits have not been determined as of this writing; however, the applicant claims such future credits as part of the present invention and those will be further described in future claims.

DETAILED DESCRIPTION OF THE DRAWINGS

Figure 1:
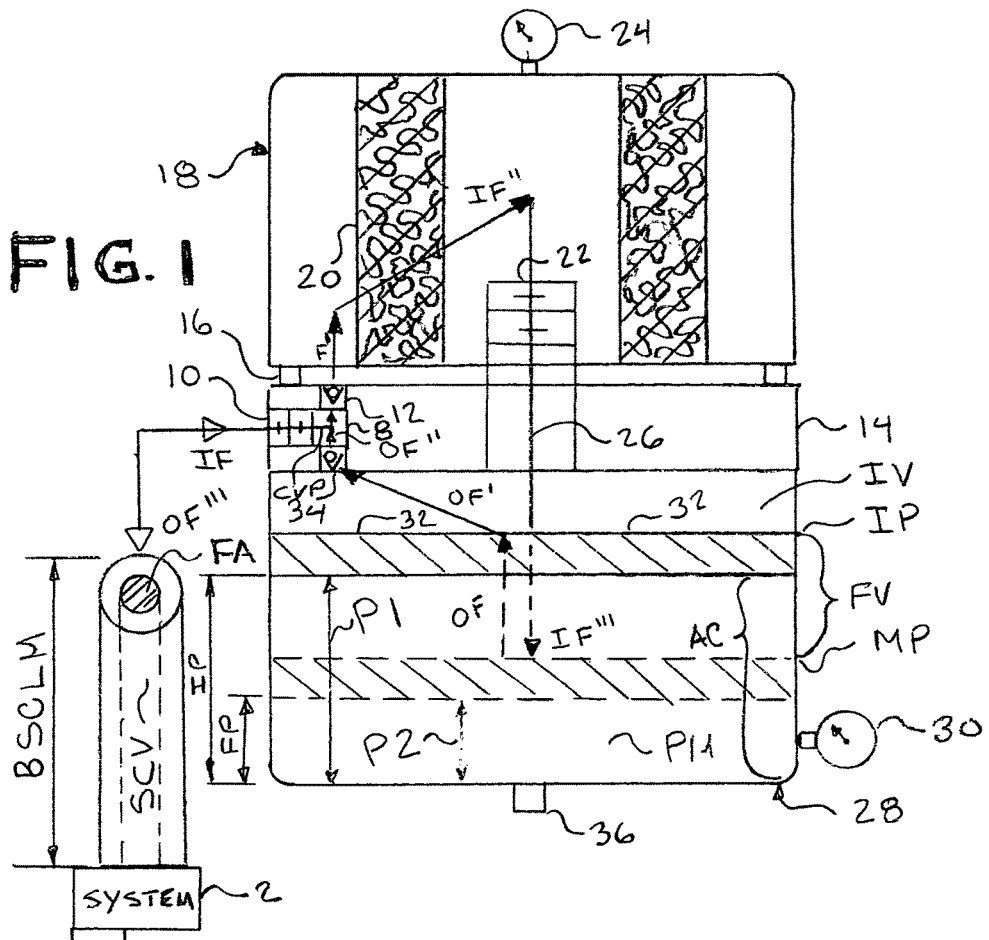
FIG. 1 Is a schematic view of the present invention showing connection of the accumulator and the high efficiency filter in combination with the check valves, where the operating position of the representative piston is shown to illustrate the apparatus operation.

Now referring to FIG. 1, it illustrates the schematic connection of the present invention to a hydraulic system 2. Hydraulic system 2 is representative of an engine lubrication system, an industrial hydraulic system, a fuel system and for that matter any system having a variable pressure operating scheme. Said Hydraulic system 2 is connected to the present invention by a bidirectional single conduit length means BSCLM, said bidirectional single conduit length means BSCLM has an effective flow area FA, said bidirectional single conduit length means BSCLM and said effective flow area FA define a single conduit volume SCV captured within the bidirectional single conduit length means BSCLM. It is understood by those skilled in the art that said bidirectional single conduit length means BSCLM can have a length of zero since the present invention can be attached directly to said hydraulic system 2.

Still referring to FIG. 1, the bidirectional single conduit length means BSCLM is connected to the present invention to a check valve chamber 8 equipped with an inflow check valve 12 and an outflow check valve 34 both sharing a hydraulic point CVP. Now referring to FIG. 2, it shows a graph showing the hydraulic system 2 operating pressure variations against time.

Figure 2:
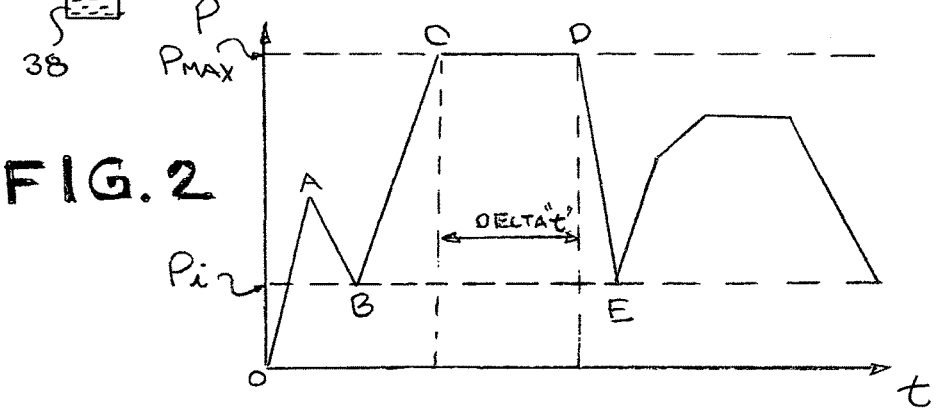
FIG. 2 Is a graph of engine or hydraulic system pressure variations correlated to the operating position of the representative piston in FIG. 1 and therefore the volume changes in the accumulator which is the volume of oil or hydraulic fluid filtered by the apparatus.

For simplicity, FIG. 2 will represent the operating pressure conditions of hydraulic system 2 being an internal combustion engine lubrication system operating pressure. Still referring to FIG. 2, it shows an origin 0 where the internal combustion engine is at rest. Upon starting said engine, said engine operating pressure surges to a point A in FIG. 2, said point A is bounded by an operating range between an idle operating pressure Pi and a maximum operating pressure Pmax. Still referring to FIG. 2, the engine comes to a point B where it achieves said idle operating pressure Pi. As said engine lubrication system operating pressure increases from said point B to a new operating point C, said operating point C staying for a period of time delta "t" at said maximum operating pressure Pmax for a period of time, correspondingly now referring to FIG. 1, said point B in FIG. 1 corresponds to an idle position IP of a piston 32 inside a piston type accumulator 28.

Still referring to FIG. 1, as said operating point B progresses to said point D in FIG. 2, piston 32 now correspondingly moves to a maximum position MP shown in FIG. 1. Piston 32 achieves said maximum position MP because system 2 is equipped with a working fluid 38, said working fluid as said operating point B progresses to said point D in FIG. 2 flows towards the present invention though said bidirectional single conduit length means BSCLM as an inflow IF through a hydraulic point of connection 10 and into said check valve chamber 8, through said inflow check valve 12 to create an inflow F'. Still referring to FIG. 1, said inflow F' then flows through high efficiency media 20, contained within a high efficiency filter 18. Once said inflow F' flows through said high efficiency media 20 it creates an inflow IF" which is now substantially filtered to an analytical state. Said inflow IF" is made to flow next through a filter stud 22 which hydraulically connects to said accumulator 28. Still referring to FIG. 1, and still correlating to said operating point B progressing to said point D in FIG. 2, IF" now flows into an initial volume IV displacing piston 32 from said idle position IP to said maximum position MP as an inflow IF''' comes to a zero flow at or before said operating point D in FIG. 2.

As piston 32 comes to maximum position MP, as shown in FIG. 1, said accumulator 28 is considered having a full charge volume FV defined by an inherent volume displaced by piston 32 moving from idle position IP to maximum position MP. Still referring to FIG. 1, said accumulator is equipped with an air chamber AC, having an initial pressure P1 corresponding to said operating point B in FIG. 2, and corresponding to idle position IP. As said operating point B progresses to said point D in FIG. 2, at or before said point D piston 32 achieves said maximum position MP which defines the point of full charge volume FV and which also corresponds to an air chamber pressure P2. Still referring to FIG. 1, said air chamber pressure P2 is higher than air chamber pressure P1.

Now referring to FIG. 2, said engine operating pressure drops to an operating point E, that corresponds to said idle operating pressure Pi, from operating point D, and this establishes the migration of piston 32 from maximum position MP to idle position IP by means of said air chamber pressure P2 being higher than air chamber pressure P1 an exerting force on piston 32 in FIG. 1. where an outflow OF is established that creates an outflow OF', said outflows OF and OF' evacuates said full charge volume FV through said outflow check valve 34 creating an outflow OF'' that flows to said hydraulic point CVP and out of the present invention through said hydraulic point of connection 10 creating an outflow OF''' that flows now through said bidirectional single conduit length means BSCLM and back into said internal combustion engine lubrication system which for simplicity was representing the operating pressure conditions of said hydraulic system 2. The difference between said full charge volume and said single conduit volume SCV is the net contribution of filtered working fluid returned to hydraulic system 2 as shown in FIG. 1.

It is clear to those skilled in the art that said air chamber pressure may be a coiled spring, and that said accumulator 28 can be of the diaphragm type, or other. As can be appreciated to those skilled in the art, the present invention uses the natural pressure variations in said system 2 to effect finer filtration of working fluid 38, therefore delivering a cleaner state of said working fluid 38 as said hydraulic system 2 operates.

Said high efficiency filter is also equipped with a gasket 16 to fluidly seal filter 18 against a connecting structure 14 that fluidly connects said filter 18, said accumulator 28 and houses inflow check valve 12 and outflow check valve 34. Accumulator 28 in FIG. 1, is also equipped with an air charging valve 36 to increase or decrease said air chamber AC pressure. Said filter 18 can also be equipped with a temperature sensor 24 to monitor flow conditions as the temperature of said working fluid 38 is an analog or a signal that filter 18 is not clogged. Accumulator 28 can also be equipped with an air gauge 30 to monitor air chamber AC pressure variations.

Figure 3:
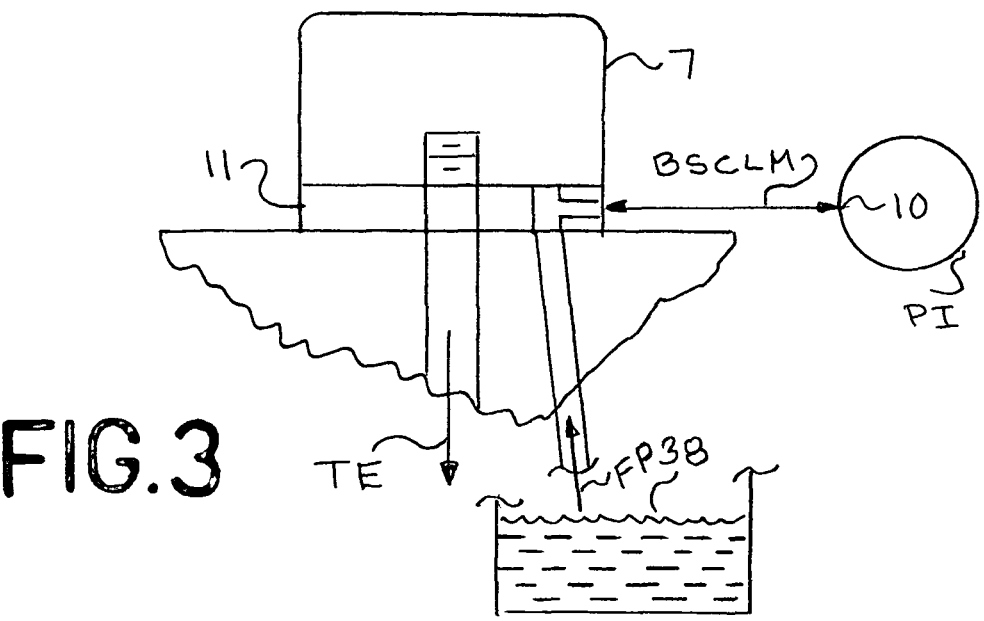
FIG. 3 Is a schematic diagram showing the manner of connecting the apparatus to representative systems for spin-on filters in engines or hydraulic systems.
Figure 4:
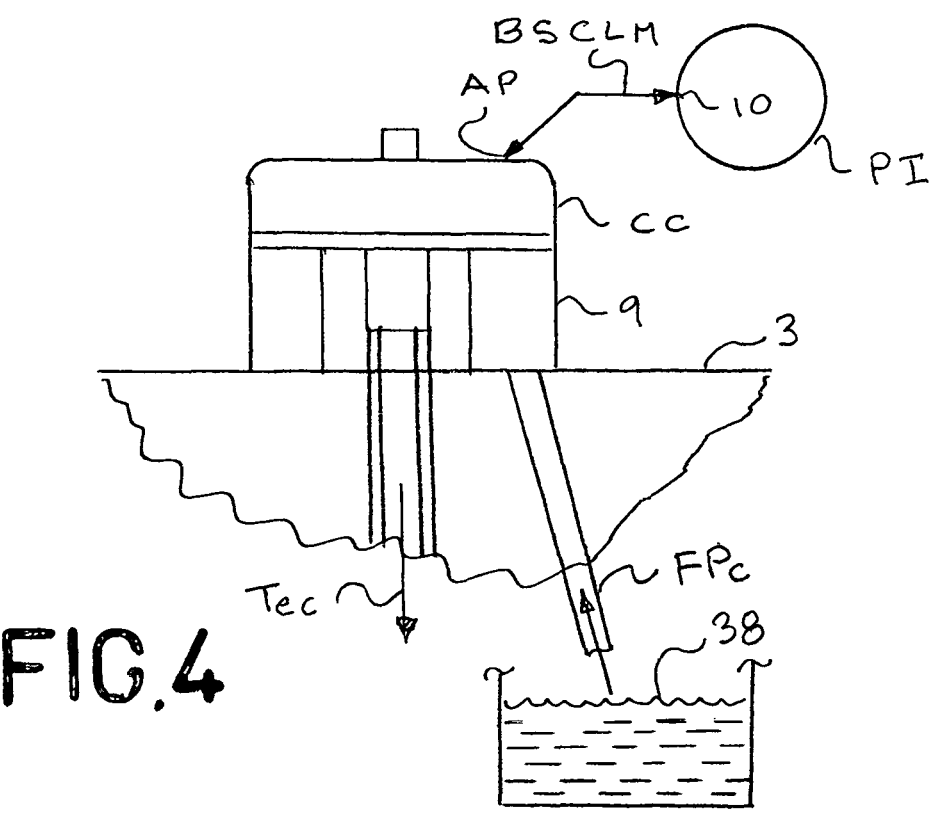
FIG. 4 Is a schematic diagram showing the manner of connecting the apparatus to representative systems for canister type filters.

Now referring to FIG. 3, it shows the present invention PI connected via said bidirectional single conduit length means BSCLM to an engine or hydraulic system equipped with a spin-on oil filter 7 through a well known sandwich adapter 11 where said working fluid 38 is made to flow to the filter via a tube FP and fluidly connect to said bidirectional single conduit length means BSCLM and return the filtered fluid to join a flow TE. Now referring to FIG. 4, it shows the present invention PI connected via said bidirectional single conduit length means BSCLM to a canister equipped engine or hydraulic system 3 by providing an access point AP in a normally provided canister cover CC that fluidly connects a filter canister body 9 where said working fluid 38 is made to flow to the filter canister body 9 via a tube FPc and fluidly connect to said bidirectional single conduit length means BSCLM and return the filtered fluid to join a flow Tec.

It will be understood that each of the elements described above, or two or more together may also find a useful application in other types of methods differing from the type described above.

While certain novel features of this invention have been shown and described and will be pointed out in future claims, it is not intended to be limited to the details above, since it will be understood that various omissions, modifications, substitutions and changes in the forms and details of the device illustrated and its operation can be made by those skilled in the art without departing in any way from the spirit of the present invention.

I claim:

1. An apparatus for providing filtration for hydraulic systems and internal combustion engines, said systems and engines having a pressure variable lubricant working fluid, said apparatus fluidly connected to said systems and engines and comprising a bidirectional single conduit length means (BSCLM), an inflow check valve, an outflow check valve, a filter having an inlet and an outlet, and an accumulator, said BSCLM accessing the working fluid wherein said working fluid is routed into the apparatus by said BSCLM to admit said working fluid into the apparatus through said inflow check valve fluidly connected to said inlet of said filter and routed from said outlet of said filter to said accumulator wherein a charge volume of said working fluid is returned to said hydraulic systems and engines through said outflow check valve fluidly connected to said BSCLM to discharge said charge volume back into said systems and engines, whereby said charge volume is returned filtered by said apparatus.

2. The apparatus as claimed in claim 1 and further comprising a temperature sensor to monitor said working fluid flow conditions through said filter.

3. The apparatus as claimed in claim 1 and further comprising an air gauge to monitor pressure variations within said accumulator.

4. The apparatus as claimed in claim 1 and further comprising an air charging valve connected to said accumulator.

* * * * *